J. M. MARTIN.
COTTON CHOPPING MACHINE.
APPLICATION FILED OCT. 19, 1908.

959,774.

Patented May 31, 1910.

2 SHEETS—SHEET 1.

WITNESSES:

INVENTOR
John M. Martin
BY
John M. Spellman
ATTORNEY

J. M. MARTIN.
COTTON CHOPPING MACHINE.
APPLICATION FILED OCT. 19, 1908.

959,774.

Patented May 31, 1910.
2 SHEETS—SHEET 2.

WITNESSES

INVENTOR
John. M. Martin
BY
ATTORNEY

UNITED STATES PATENT OFFICE.

JOHN M. MARTIN, OF FRISCO, TEXAS.

COTTON-CHOPPING MACHINE.

959,774.  Specification of Letters Patent.  Patented May 31, 1910.

Application filed October 19, 1908. Serial No. 458,486.

*To all whom it may concern:*

Be it known that I, JOHN M. MARTIN, citizen of the United States, residing at Frisco, in the county of Collin and State of Texas, have invented certain new and useful Improvements in Cotton-Chopping Machines, of which the following is a specification.

My invention relates to new and useful improvements in cotton chopping machines.

The object of my invention is to provide a cotton chopping machine which will carry a mechanically driven hoe which will properly space and chop cotton stalks.

Another object of my invention is to provide in a cotton chopping device, a machine which will be attached to the frame of a standard cultivator and thin the cotton as the ground is being cultivated.

Still another object of my invention is to provide a cotton chopping machine which will automatically adjust the chopping means for high and low ground while the machine is in motion.

A final object of my invention is to provide a cotton chopping device which will be strong, durable, efficient and comparatively inexpensive to construct, and also one in which the several working parts will not be liable to get out of working order.

Figure 1:
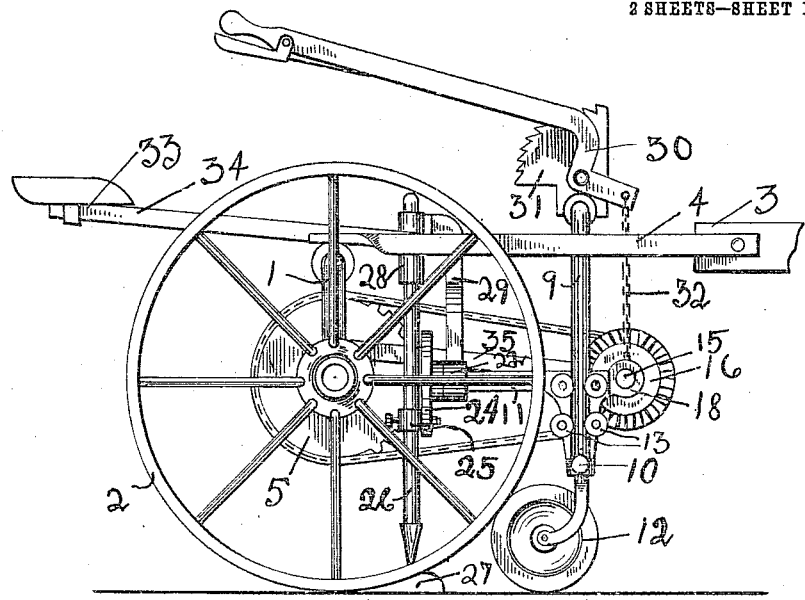
Figure 2:
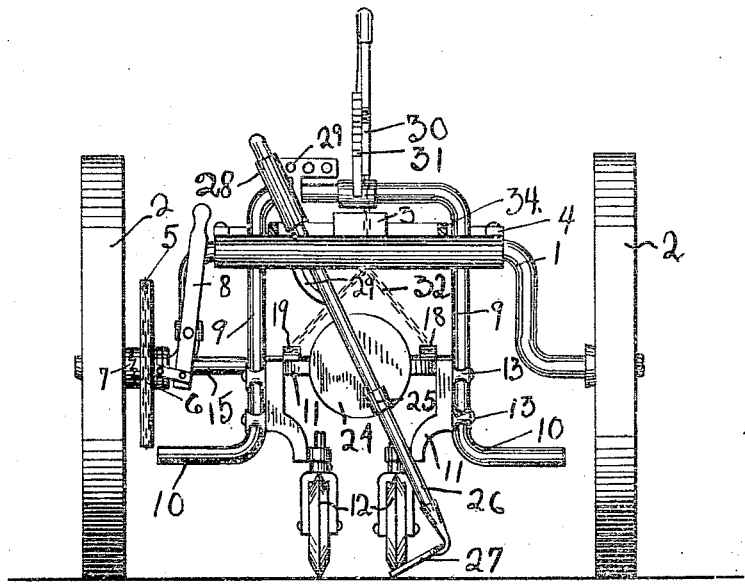
Figure 3:
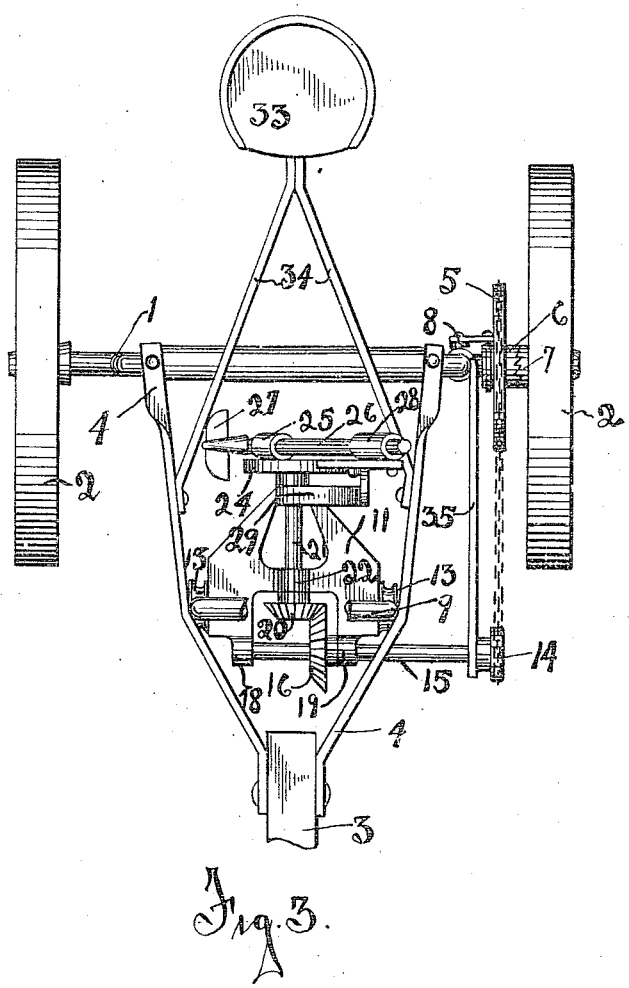

With these and other objects in view, my invention has particular relation to certain novel features of construction and operation, an example of which is described in the following specification and illustrated in the accompanying drawing, wherein:

Figure 1 is a side elevation of my machine, Fig. 2 is a rear elevation of the same, and Fig. 3 is a plan view with a portion of the arch broken away.

In the drawings, the numeral 1 designates an arched axle mounted on ground wheels 2 and having connection with a tongue 3 through connecting rods 4. A sprocket wheel 5 on the axle carries a clutch member 6 adapted to engage with a clutch member 7 carried on the ground wheels 2. A lever 8 fixed to operate this clutch is also mounted on the axle 1.

An arch 9 supported from the connecting rods 4 has outwardly extending arms 10 arranged to form a support for any suitable cultivator gang or gangs. A frame 11 mounted on ground wheels 12 carries rollers 13 arranged to engage with the downwardly extending portions of the arch 9 in such a way as to allow the frame to be raised or lowered by the ground wheels 12 and still maintain its horizontal position.

A sprocket 14 carried on a shaft 15 is connected with the sprocket 5 by a suitable flexible connection and transmits motion to a miter gear 16 mounted on shaft 15 supported in bearings 18 and 19. This gear transmits power through a pinion 20 mounted on a shaft 21 passing laterally across the frame 11 and is supported in bearings 22.

A disk 24 mounted on the shaft 21 has pivotal connection with a collar 25 which fits around and is set screwed to a handle 26 attached to a hoe 27. The upper end of the handle 26 is fixed to slide in a sleeve 28 which has pivotal connection with a support 29 mounted on the frame 11.

When the disk 24 is made to revolve by the ground wheels 2 and the upper end of the handle is properly adjusted on the support 29, the hoe will be given an oscillating stroke which will thin the cotton as the machine is drawn across the field.

For adjusting the height of the frame 11 independently of the ground wheels 12, a bell crank lever 30 is pivotally mounted on a segment 31 carried on the arch 9 and has connection with the bearing 18 and 19 by means of a chain 32. This lever is arranged to be operated from a seat 33 mounted on a support 34.

An extra support 35 for shaft 15 has pivotal connection with the axle 1 so that it will not interfere with the raising and lowering of the frame 11.

What I claim, is:

1. In a cotton chopping device, the combination of a main frame provided with depending arch portions, wheels carrying said frame, an independently vertically movable secondary frame slidably connected to said arch portions, the entire support for said secondary frame being approximately in a plane with said depending arch portions, a chopping device carried by said secondary frame, and driving connections for said chopping device operated from said wheels the slidable connection between said secondary frame and depending arch portions comprising oppositely disposed series or rollers on the secondary frame bearing upon said depending arch portions.

2. In a cotton chopping device, the combination with a main frame provided with depending arch portions, wheels carrying said main frame, an independently vertically movable secondary frame slidably connected to said extensions, the entire support for said secondary frame being approximately in a plane with said depending arch portions, a chopping device carried by said secondary frame, and driving connections for said chopping device operated from said wheels in combination with a pair of ground rollers connected to the secondary frame whereby the latter will be automatically raised and lowered.

3. In a cotton chopping device, the combination of a main frame provided with depending arch portions wheels carrying said main frame, an independently vertically movable secondary frame slidably connected to said depending arch portions, friction rollers mounted on said secondary frame and adapted to engage the opposite sides of said depending arch portions, the entire support for said secondary frame being approximately in a plane with said depending portions, a chopping device carried by said secondary frame, driving connections for said chopping device operated from said wheels and means positioned approximately above said slidable connections for raising and lowering said secondary frame.

In testimony whereof I have signed my name to this specification in the presence of two subscribing witnesses.

JOHN M. MARTIN.

Witnesses:
 LELAN LUIRS,
 JACK A. SCHLEY.